May 26, 1959
J. A. VOLK
2,888,635
STICK FORCE TRANSDUCER
Filed June 26, 1957
3 Sheets-Sheet 1
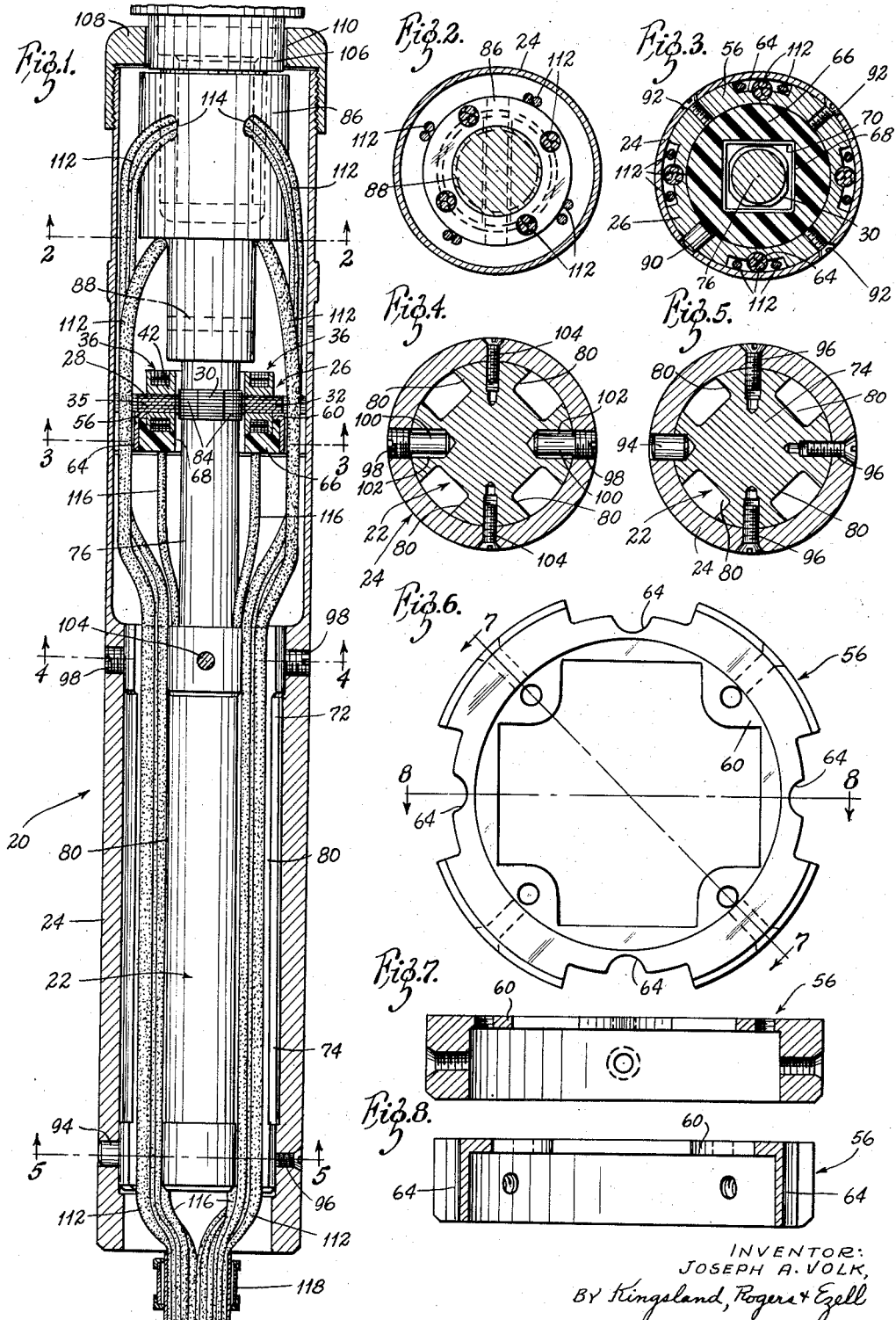
INVENTOR:
JOSEPH A. VOLK,
BY Kingsland, Rogers & Ezell
ATTORNEYS May 26, 1959      J. A. VOLK      2,888,635
STICK FORCE TRANSDUCER
Filed June 26, 1957      3 Sheets-Sheet 2
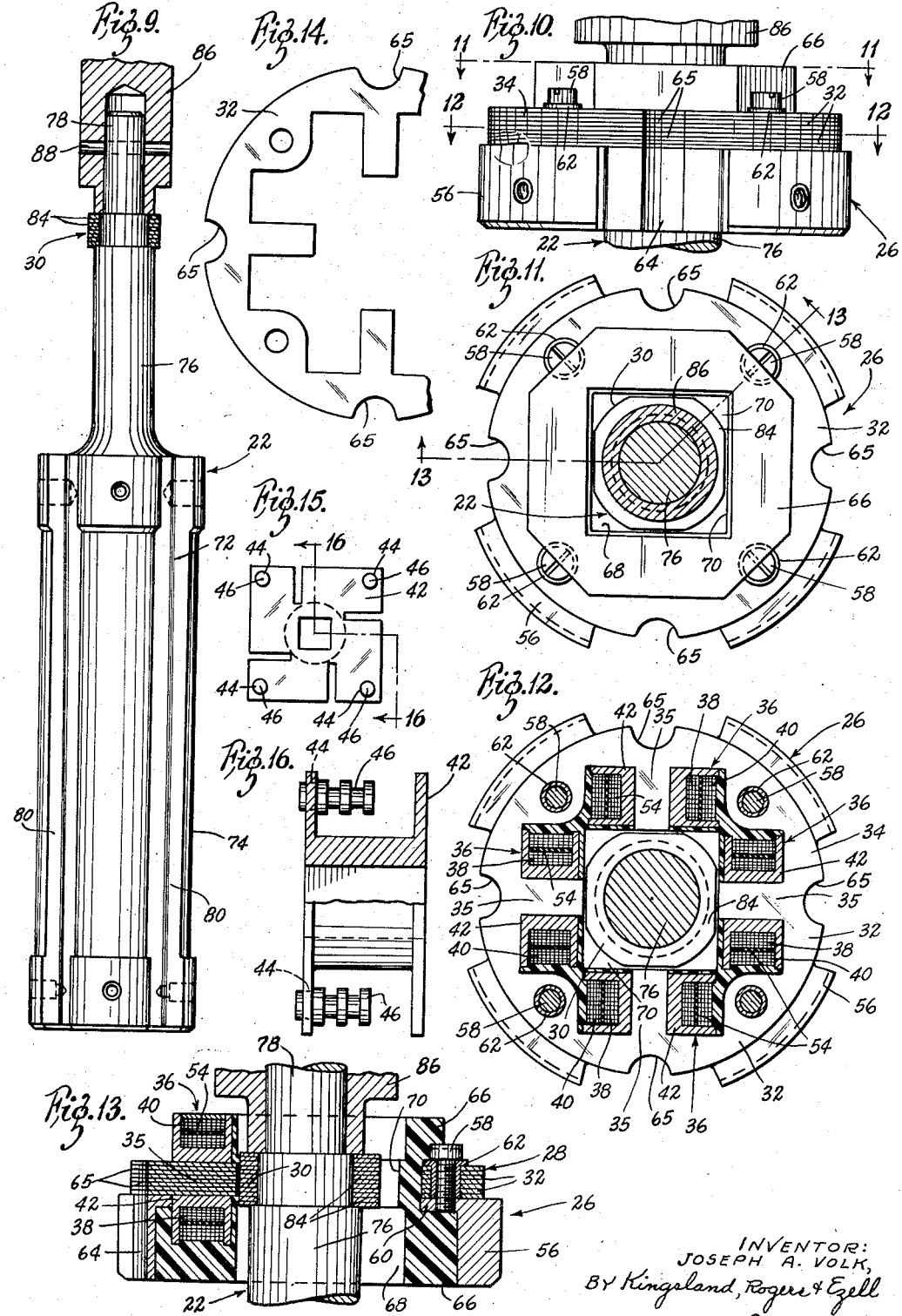
INVENTOR:
JOSEPH A. VOLK,
BY Kingsland, Rogers & Ezell
ATTORNEYS May 26, 1959
J. A. VOLK
2,888,635
STICK FORCE TRANSDUCER
Filed June 26, 1957
3 Sheets-Sheet 3
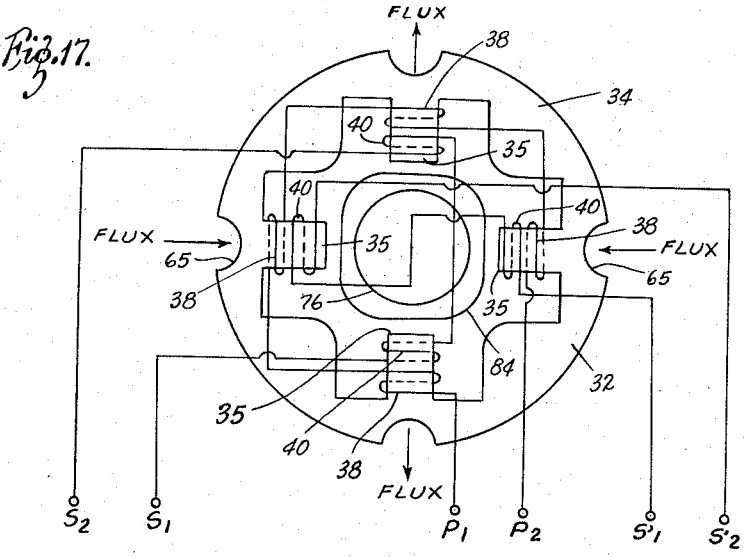
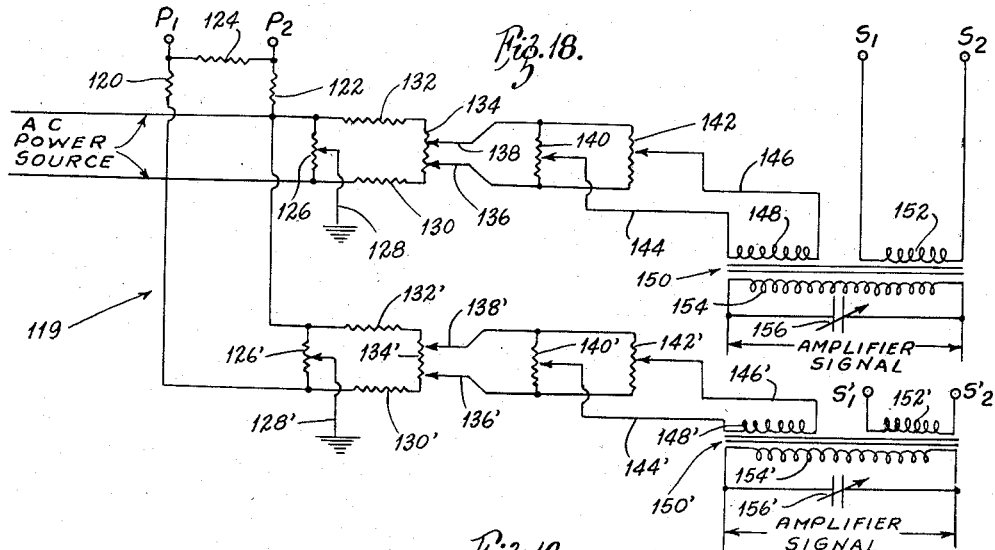
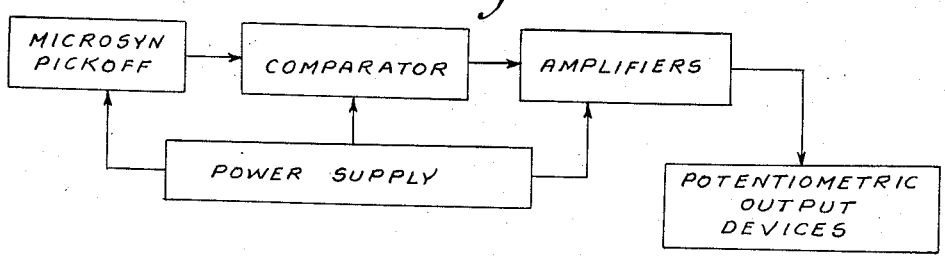
INVENTOR:
JOSEPH A. VOLK,
BY Kingsland, Rogers & Ezell
ATTORNEYS United States Patent Office 2,888,635
Patented May 26, 1959

2,888,635

STICK FORCE TRANSDUCER

Joseph A. Volk, Normandy, Mo., assignor to Mandrel Industries, Inc., Houston, Tex., a corporation of Michigan Application June 26, 1957, Serial No. 668,195

12 Claims. (Cl. 323—51)

The present invention relates generally to force responsive sensing devices, and more particularly to a novel stick force transducer for sensing both the direction and magnitude of an applied mechanical force, and providing a compound electrical response in a form which effectively resolves the applied force into predeterminately oriented, mutually perpendicular force vectors.

The invention finds essential utility in conjunction with aircraft in which movements of both the elevator and the ailerons is effected by means of a single universally movable manual control.

In brief, the invention contemplates a control stick which incorporates means for picking up or detecting both the force and the direction of a pilot's effort to move it. The picked up intelligence is presented electrically in a form which enables it to be divided into components proportional to corresponding predetermined directional force components the resultant of which represents the total applied force. Thus presented, the picked up intelligence may be used in the control of proportionate power boosters, as well as for purposes of indicating and recording operational test data and the like.

The transducer pick-up device makes us of a novel extension of the theory employed in so-called "microsyn" detecting devices. Specifically, whereas microsyn development has heretofore centered almost entirely around a pivoted armature which is restricted to angular movements of but a few degrees, the device herein disclosed includes a microsyn armature specifically shaped and mounted for translatory movement rather than for angular movement. This new armature, or slug, can be moved in any direction in the plane of its normal centered position within the microsyn field, and both the direction and magnitude of movement can be detected electrically.

It is an object of the present invention, therefore, to provide a novel stick force transducer which incorporates a pick-up device which is sensitive both to the magnitude and to the direction of an applied force.

It is another object of the invention to provide a novel stick force transducer which is capable of effectively resolving an applied stick force into predetermined directional components and presenting a corresponding compound electrical response.

It is another object of the invention to provide a novel stick force transducer which incorporates a microsyn pick-up in conjunction with a flexible cantilever element having universal force responsive movement.

It is another object of the invention to provide a novel stick force transducer which incorporates a microsyn device having an armature mounted for universal translatory movement relative to a microsyn stator.

It is another object of the invention to provide a novel electromagnetic pick-up device which includes a stator having a plurality of electromagnetic poles and an armature comprising a slug of magnetic material mounted for universal translatory movement relative to the stator.

It is another object of the invention to provide a novel electromagnetic pick-up which employs variable reluctance induced by translatory movement of a magnetic armature.

The foregoing, along with additional objects and advantages, will become apparent from the following description of a specifiec embodiment of the invention as illustrated in the accompanying drawings, in which:

Figure 1 is a central vertical section of a control stick assembly incorporating a stick force transducer conforming to the invention;

Figures 2, 3, 4, and 5 are horizontal cross sections taken generally along the lines 2—2, 3—3, 4—4, and 5—5 in Figure 1;

Figure 6 is a bottom plan view of a removed stator mounting ring drawn to enlarged scale;

Figures 7 and 8 are vertical sections taken, respectively, along the lines 7—7 and 8—8 in Figure 6;

Figure 9 is a vertical elevation showing a control stick provided with a microsyn slug and an upper link, the latter elements being shown in section;

Figure 10 is a fragmentary vertical elevation showing a microsyn assembly;

Figures 11 and 12 are horizontal sections taken, respectively, along the lines 11—11 and 12—12 in Figure 10;

Figure 13 is a central vertical section through the microsyn assembly in Figure 10;

Figure 14 is a fragmentary horizontal plan view of a stator lamination;

Figure 15 is a plan view of a coil form;

Figure 16 is an enlarged section taken generally along the line 16—16 of Figure 15;

Figure 17 is a schematic winding diagram for a microsyn stator;

Figure 18 is a diagram illustrating a preferred comparator hook-up for the transducer; and Figure 19 is a block diagram showing a typical arrangement of parts associated with the transducer.

Referring more particularly to the details of the drawings as indicated by reference characters, the numeral 20 indicates generally an assembled stick force transducer constructed in accordance with the teachings of the present invention. The assembly 20 includes a control stick and link assembly 22, shown removed in Figure 9, and a concentric tubular housing 24 in enclosing relation to the stick and link assembly 22. A microsyn assembly, indicated generally by the numeral 26, includes a stator assembly 28 which is fixedly mounted within the tubular housing 24 and an armature assembly or slug 30 disposed centrally of the stator 28 and forming part of the stick and link assembly 22.

Directing attention first to the microsyn assembly 26, a plurality of stator laminations 32 shaped as indicated by the fragmentary illustration of Figure 14 are arranged in a stack to form a stator core 34. The laminations 32 are of magnetic material and are stacked in coincidence with one another so as to provide four inwardly projecting pole elements 35, as shown clearly in Figure 12. An individual coil assembly 36 is disposed about each of the poles 35, it being understood, however, that the individual coils may, for various purposes, differ between themselves. In the instant illustration, each of the four coil assemblies 36 comprises a primary coil 38 and a secondary coil 40.

Notwithstanding possibly different windings, the coil assemblies 36 have identical coil forms or spools 42 formed as clearly illustrated in Figures 15 and 16 from a non-magnetic material, such as nylon. One of the side plates of each spool 42 is provided with holes 44 in which terminal posts 46 are mounted as needed (Figures 15 and 16). The coil forms 42 here considered are provided with four terminal posts 46, two being for connection of opposite ends of the inner primary winding 38, and two being for connection of the opposite ends of the outer secondary winding 40. The coils 38 and 40 are separated from each other by an insulating strip 54.

A stator mounting ring 56 having the shape clearly depicted in Figures 6, 7 and 8 mounts the stator core 34, along with the several coil assemblies 36 supported thereon, and is secured by screws 58 which extend through the core 34 for threaded engagement with a radially inwardly extending plate portion 60 of the mounting ring 56. Preferably, the screws 58 extend through bushing 62 forming a part of the core 34 and serving to retain the individual laminations 32 in precise stacked relation. It will be noted from Figure 6 that the plate portion 60 is formed to accommodate the several coil assemblies 36. Also, the peripheral face of the ring 56 is relieved, as indicated at 64, not only to conform with corresponding notches 65 in the laminations 32, but to provide added clearance for electrical conductors, as will appear.

With the stator core 34 secured to the mounting ring 56 as above indicated and with the several coil assemblies 36 in place on the pole pieces 35, the parts thus assembled are preferably placed in an appropriate mold and filled with resin 66 which, as best shown in Figure 13, extends from the lowermost edge of the mounting ring 56 to the uppermost extension of the coil assemblies 36. This leaves an upstanding projection of resin 66 which may be conveniently formed to the octagonal periphery indicated in Figures 10 and 11. A square aperture 68 is provided through the molded resin 66, and, as is clear from Figures 11, 12 and 13, a minimum area of opening 70 is formed adjacent the inner ends of the poles 35. While it is preferred that this portion 70 of the rectangular aperture be formed accurately to the dimensions imposed by the ends of the poles 35, the remaining portions of the aperture 68 are less critical and may be formed to the approximate relative size indicated.

It is apparent from the several Figures 10 through 13 that the stick and link assembly 22 extends through the square aperture 68 of the microsyn assembly 26. Directing attention to the assembly 22, therefore, a control stick 72 is illustrated in Figure 9 as having a lower main body portion 74, an intermediate flexible portion 76, and an upper connecting portion 78. The main body portion 74 has the general form of an elongated rod of circular cross section provided with four slots or grooves 80 which are indicated clearly in Figures 4 and 5, in addition to being shown in Figure 9. The upper and lower ends of the main body portion 74 are finished accurately to predetermined cylindrical diameters for a purpose to appear, the major central portion of the main body 74 being of smaller and less critical diameter. The flexible portion 76 extends coaxially above the main body portion 74 and is formed to a uniform diameter sufficiently small to provide an appropriate degree of flexibility under normal operational stresses, as will be explained more fully hereinafter. The upper end of the flexible portion 76 has a slightly further reduced diameter for accommodating the slug 30 formed from a stack of individual laminations 84 and having the plan shape clearly depicted in Figures 11 and 12. Finally, the connecting portion 78, formed to a still smaller diameter, engages a connecting link 86 which serves to retain the slug 30 and is in turn retained by a pin 88.

Directing attention now to Figure 1, it will be observed that the tubular housing 24 fully encloses the stick and link assembly 22. The lower portion of the housing 24 is formed to fit the accurately sized end portions of the main body 74 of the control stick 72. Above the portion of the housing 24 which receives the aforesaid main body 74, the hollow interior of the member 24 is somewhat enlarged. At an intermediate position in this enlarged portion of the housing 24, there is provided an accurately sized cylindrical surface of limited vertical extent for accommodating the correspondingly accurately formed periphery of the stator mounting ring 56 of the microsyn assembly 26. The cross section of Figure 3 shows clearly the manner in which the microsyn assembly 26 is retained within the housing 24, by a drive pin 90 and three screws 92.

Figures 11 and 12, along with Figure 3, illustrate a normal concentric relationship to exist between the axis of the stick and link assembly 22 which mounts the slug 30 and the restricted square aperture 70 defined primarily by the free ends of the poles 35 of the microsyn assembly 26. It is essential, therefore, for the stick and link assembly 22 to be appropriately oriented with respect to the microsyn assembly 26. To this end, as best shown in Figure 5, a drive pin 94 is provided at the lower end of the control stick 72 and housing 24, in addition to three retaining screws 96. The drive pin 94, of course, prevents angular displacement between the assembly 22, with its slug 30, and the microsyn assembly 26. Preferably, however, there is provided an arrangement, such as that illustrated in Figure 4, for obtaining final accurately centered positioning of the slug 30 within the square opening 70. As clearly illustrated in the cross section of Figure 4, opposed adjusting screws 98 having threaded engagement with the housing 24 only and having inwardly extending pin portions 100 adapted for engagement with the bottoms of holes 102 formed in the control stick 72 serve to effect lateral adjustment of the upper end of the main body portion 74 within the sleeve-like housing 24. At the same time, screws 104 having threaded engagement with the member 72 exert both a centering and a retaining function.

Referring once more to Figure 1, the link member 86 secured to the upper end of the control stick 72 is surmounted by a connector 106 which extends on above the tubular housing 24. The upper end of the latter is closed by a cap 108 having a central aperture 110 of sufficient diameter to accommodate slight lateral movement of the connector 106 relative to the cap 108 as a result of flexure of the flexible portion 76 of the stick 72. Apart from the present invention, it will be understood that the connector 106 is in turn surmounted by a suitable handle (not shown) provided with various electrical contact buttons, switches, etc. (not shown).

Figures 1, 2 and 3 illustrate the general arrangement of electrical conductors within the tubular housing 24. Certain of these conductors, such as those indicated generally by the numeral 112, for example, extend down through the connector 106 to emerge through holes 114 therein and pass on down through the previously mentioned grooves 64 formed in the stator mounting ring 56. The wires 112, along with wires 116 from the microsyn assembly 26, then extend downwardly through the grooves 80 in the main body portion 74 of the control stick 72, finally to emerge at the lower end of the tubular housing 24 where they are gathered together and retained by an appropriate clamp 118.

Directing attention to the electrical and magnetic circuits associated with the above described structure, the schematic illustration of Figure 17 shows a preferred arrangement of windings on the microsyn stator core 34. As here illustrated, the four coil assemblies 36, each comprising its individual primary coil 38 and secondary coil 40, are interconnected to provide a single four-pole primary winding designated $P_1$—$P_2$, and two twin-pole secondary windings designated $S_1$—$S_2$ and $S_1'$—$S_2'$, respectively. The relative winding sense of the individual coils is clearly indicated in Figure 17.

Figure 18 illustrates a preferred comparator hookup 119 by means of which electrical variations in the microsyn windings may be detected in respect both to direction and extent. As here illustrated, an appropriate A.C. power source is connected across the primary circuit $P_1$—$P_2$, the connection being made through current limiting resistors 120 and 122, and across a voltage dividing resistor 124. The same power source is connected across a potentiometer 126 having a grounded variable tap 128, and through current limiting resistors 130 and 132 to a variable voltage divider 134 having twin taps 136 and 138. Potentiometers 140 and 142 having variable taps 144 and 146, respectively, are connected in parallel between the taps 136 and 138.

The variable taps 144 and 146 are connected to opposite ends of a primary coil 148 of a transformer 150, but it will be observed that the coil 148 comprises only part of the primary winding of the transformer 150, another part, designated 152, being connected between the terminals of the previously described secondary winding $S_1$—$S_2$ of the microsyn stator 34. A secondary winding 154 of the transformer 150 is bridged by a trimming capacitor 156 and provides input for an electronic amplifier which does not appear in the diagram of Figure 18.

As is clear from Figure 18, the above described arrangement connecting the A.C. power source to a primary transformer coil is duplicated for accommodation of the microsyn secondary $S_1'$—$S_2'$. The duplicate elements are designated by primed numerals in correspondence with the arrangement previously described in connection with the microsyn secondary $S_1$—$S_2$.

The block diagram of Figure 19 illustrates a general arrangement of parts whereby the intelligence picked up by the microsyn assembly 26 and resolved by the comparator 119 is amplified by conventional electronic means for operating appropriate known potentiometric output devices in servo systems and the like.

Operation

It is, of course, understood that the stick force transducer 20 assembled as above described and as clearly illustrated in the drawings, is normally incorporated in an aircraft or the like having characteristics of size and flying speed which, together, combine to impose substantial aerodynamic resistance to movement of the elevator and ailerons. The assembly 20 is adapted for use as the manually movable control stick by means of which a pilot may operate the aforementioned control surfaces. Thus, the lower end of the tubular housing 24 will be secured to an appropriate universally movable joint member (not shown) so that movement of the upper end of the assembly 20 in various directions will effect conventional controlling movement of the connected control surfaces.

It is clear that any movement or force which may be applied to the connector 106 or to the handle surmounting the same will also effect some bending in the flexible cantilever portion 76 of the control stick 72. The amount of bending will be very slight under normal operational loads, however, so that the feel of the control will be fully conventional, without the pilot being able to detect this bending movement. It is evident, though, that any bending movement whatever in the portion 76 will necessarily provide lateral displacement of the slug 30 within the microsyn assembly 26. Normally, these movements will be of relatively minute degree and never, for example, sufficient to cause engagement of the slug with any of the poles 35.

Referring once more to Figure 17, the illustrated primary winding $P_1$—$P_2$ is effective, when energized, to establish a normal magnetic flux distribution which excites like polarities in diametrically opposed poles 35 of the microsyn stator 34. It will also be observed that each of the secondary windings $S_1$—$S_2$ and $S_1'$—$S_2'$ is arranged so that, considering either of the secondary circuits alone, the voltages induced by transformer action in the interconnected secondary coils 40 will be in opposition. Thus, under a normal balanced condition wherein the microsyn slug 30 is centered between the four poles 35, a null condition will obtain in each of the secondary circuits $S_1$—$S_2$ and $S_1'$—$S_2'$, notwithstanding excitation of the primary circuit $P_1$—$P_2$.

It is evident, however, that any displacement of the slug 30 relative to the microsyn stator 34 will have the effect of varying the magnetic reluctance which normally prevails in respect to individual poles 35 of the microsyn assembly 26. For example, movement of the slug 30 toward the uppermost pole 35 depicted in Figure 17 would effect a reduction in reluctance at that pole 35 and an increase in reluctance at the lowermost pole 35. The changes in reluctance are, in turn, effective to produce phase shift in the voltages induced in the secondary windings 40 of the uppermost and lowermost poles 35. Since, as previously noted, the secondary voltages induced at these poles are in opposition to each other, and since the phase shift will be in opposite directions owing to the increase of reluctance at one pole and the decrease of reluctance at the other pole, the null condition will give way to a condition where a resultant voltage appears at the terminals of the secondary winding $S_1$—$S_2$. Moreover, the phase angle of this resultant voltage, as compared to an appropriate reference, will correspond to the up or down direction while the magnitude of the resultant voltage will correspond to the extent of movement of the slug 30.

If, as assumed above, the movement of the slug 30 is wholly in line with one pair of opposed poles 35, the voltages induced in the secondary windings of the other pair will remain in balanced opposition, inasmuch as any change in reluctance at the second pair will be identical with respect to the individual poles of this pair. Where, on the other hand, the slug 30 is moved in a direction other than in line with either of the opposed pairs of poles 35, a voltage response will appear at both sets of secondary terminals $S_1$—$S_2$ and $S_1'$—$S_2'$.

Figure 18 illustrates the manner in which the individual voltages produced as above described are fed to the primary windings 152 and 152' of respective transformers 150 and 150' for comparison with reference voltages placed across the corresponding primary windings 148 and 148'. The reference voltages originate in the same power source that supplies the primary winding $P_1$—$P_2$ and conventional elements are provided for adjustment and calibration to appropriate comparison values.

The separate channels associated with the two secondaries $S_1$—$S_2$ and $S_1'$—$S_2'$ enable movements of the slug 30 in any direction to be automatically resolved into right angled components of direction so that the secondary windings 154 and 154' of the transformers 150 and 150' can provide individual amplifiers with signals which correspond to the component of movement of the slug 30 in a particular predetermined direction. As indicated in Figure 19, the amplified signals may be fed to conventional potentiometric output devices for controlling servo power units and the like. Thus, the device here disclosed functions to sense both the magnitude and the direction of an applied force and to present such intelligence as an electrical response. Moreover, an applied force may be effectively resolved into perpendicular components corresponding to the directions of the two pairs of diametrically opposed poles 35, so as to indicate, for example, the net forces which are separately effective with respect to the elevator and the ailerons of an airplane.

Clearly, there has been provided a stick force transducer which fulfills the objects and advantages sought therefor.

It is to be understood that the foregoing description and the accompanying drawings have been given only by way of illustration and example. It is further to be understood that changes in the form of the elements, re-

What is claimed is:

1. A stick force transducer comprising a control stick mounted for universal movement in response to applied forces, said control stick having a flexible portion adapted to bend in predetermined correspondence to forces applied thereto, and means for detecting both the direction and magnitude of a force applied to said flexible portion, said latter means including electrical means for indicating said direction and magnitude as an electrical response.

2. A stick force transducer as set forth in claim 1 wherein the means for detecting the direction and magnitude of an applied force comprises means for detecting the extent of bending of the flexible stick portion in each of two mutually perpendicular directions and for presenting such intelligence as individual electrical responses.

3. A stick force transducer as set forth in claim 2 wherein the bending response of the flexible portion of the stick corresponds in direction with the direction of an applied force and in extent with the magnitude of the applied force, and wherein the detecting means includes a microsyn stator and a movable slug, said slug being mounted on the flexible stick portion for universal translatory movement within said stator.

4. In a stick force transducer, in combination, a control stick and a tubular housing therefor, said control stick including a relatively inflexible lower columnar portion surmounted by a flexible cylindrical upper portion, means securing said lower columnar portion rigidly in said housing, whereby a transverse application of force of selected magnitude at the top of said flexible portion will effect relative movement of corresponding extent between the flexible portion and the immediately surrounding portion of the tubular housing, and pick-off means responsive to both the direction and extent of said relative movement for detecting the direction and magnitude of a force applied as aforesaid.

5. The combination of claim 4 wherein the pick-off means comprises electromagnetic means including a stator mounted in the tubular housing and an armature mounted adjacent the upper end of the flexible portion of the control stick so as to be enclosed by said stator.

6. The combination of claim 5 wherein the stator comprises a plurality of opposed electromagnetic poles lying in a single plane, and wherein the armature comprises a movable slug of magnetic material lying in the plane of said poles for varying the reluctance of a magnetic circuit.

7. A stick force transducer arrangement comprising, in combination, a control stick assembly incorporating a section of reduced cross section susceptible to bending at a predetermined rate under applied forces, a microsyn pick-off mounted on said assembly for providing an electrical response corresponding to said bending rate, a comparator hook-up connected to said pick-off and to a reference power source for analyzing said response and providing a resultant signal corresponding to said bending rate, an amplifier connected to said comparator for augmenting said signal to produce an amplified signal corresponding to said bending rate, and a potentiometric output device for utilizing the amplified signal.

8. A microsyn device for use in a stick force transducer comprising, in combination, a stator having at least two pairs of diametrically opposed poles disposed in a common plane and arranged symmetrically about a point in said plane, a magnetic slug movably disposed in said plane in symmetry with said poles for varying the magnetic reluctance therebetween, means including a manually operable control member for moving said slug relative to said poles in predetermined correspondence with the direction and magnitude of a controlling force applied to said control member, and comparator means for evaluating changes in magnetic reluctance resulting from moving the microsyn armature various distances in a predetermined component of direction.

9. The combination of claim 8 wherein the stator comprises a primary winding including a coil around each of at least one pair of diametrically opposed poles, and a secondary winding including a coil around each of at least one other pair of diametrically opposed poles, and wherein the comparator means comprises electrical circuit means connecting the primary microsyn winding to an A.C. power source, a transformer having a sectional primary winding, additional electrical circuit means connecting one section of said transformer primary winding to sad A.C. power source, and means connecting the secondary microsyn winding to another section of said transformer primary winding.

10. A microsyn assembly for a stick force transducer comprising, in combination, a stator core having four inwardly projecting pole elements, said pole elements terminating in planar faces serving to define the sides of an imaginary square, a coil assembly disposed about each pole, at least one of said coil assemblies comprising a primary winding and a secondary winding, a microsyn slug having four external faces of planar form disposed inwardly of said pole elements for movement relative thereto, each slug face being disposed in spaced parallel relation to a respective pole face, rigid means mounting said stator core and its coil assemblies, and flexible means mounting said slug for controlled translatory movement in the plane of said pole elements.

11. The combination of claim 9 wherein the additional electrical circuit includes variable voltage dividing means for individually adjusting the amplitude and the phase of voltage placed across the one secton of the transformer primary winding.

12. The combination of claim 8 wherein the stator has four poles spaced equidistantly around a central point, a primary winding including a coil around each of said four poles, a first secondary winding including a coil around each of one pair of diametrically opposed poles, a second secondary winding including a coil around each of the other pair of diametrically opposed poles, and comparator means for evaluating changes in magnetic reluctance resulting from moving the microsyn armature various distances in each of two predetermined components of direction.

References Cited in the file of this patent

UNITED STATES PATENTS

| | | |
|---|---|---|
| 2,401,163 | Keller | May 28, 1946 |
| 2,430,757 | Conrad et al. | Nov. 11, 1947 |
| 2,583,828 | Gerstenberger | Jan. 29, 1952 |
| 2,790,119 | Konet et al. | Apr. 23, 1957 |

Notice of Adverse Decision in Interference

In Interference No. 91,033 involving Patent No. 2,888,635, J. A. Volk, Stick force transducer, final judgment adverse to the patentee was rendered Aug. 16, 1962, as to claims 1 and 2.

[*Official Gazette September 18, 1962.*]